July 6, 1954  F. RIEBER  2,683,239
MULTIPLE TRACK RECORDER
Filed May 28, 1949  2 Sheets-Sheet 1

INVENTOR,
FRANK RIEBER. DECEASED.
LU GARDA RIEBER. EXECUTRIX.
BY
Lippincott + Smith
ATTORNEYS.

July 6, 1954  F. RIEBER  2,683,239
MULTIPLE TRACK RECORDER
Filed May 28, 1949  2 Sheets-Sheet 2

INVENTOR,
FRANK RIEBER. DECEASED.
LU GARDA RIEBER. EXECUTRIX.
BY
Lippincott + Smith
ATTORNEYS.

Patented July 6, 1954

2,683,239

UNITED STATES PATENT OFFICE 2,683,239

MULTIPLE TRACK RECORDER

Frank Rieber, deceased, late of New York, N. Y., by Lu Garda Rieber, executrix, New York, N. Y., assignor to Geovision Incorporated, a corporation of New York Application May 28, 1949, Serial No. 96,046

1 Claim. (Cl. 315—24)

This invention relates to the recording, in a phonographically reproducible manner, of a plurality of electric waves, simultaneously produced but different in waveform, phase, or other characteristic. The invention is particularly adapted to the recording of seismic waves as picked up by large numbers of geophones, for geophysical exploration and analysis, but it is also applicable to the recording of waves of other types, such as sound waves, the recording of transients in electrical power circuits following faults, and the like.

In the art of geophysical exploration and analysis, seismic waves, originated by a single explosion or other shock, are recorded as received by a plurality of geophones after having been reflected or refracted by various strata through which the waves have passed. The greater the number of geophones used to pick up the seismic waves, and the more widely these geophones are dispersed in an accurately surveyed array, the greater the amount of information that can be derived from a single shock, at least within very wide limits. In the older and more conventional methods of analysis the waves were recorded as seismograms, in which the amplitude of the displacement, the velocity, or the accelerations produced by the shock are plotted against time. The inventor, in his prior Patents Numbers 2,051,153 and 2,144,812, as well as in his copending applications, Serial Numbers 53,954, 65,883, 82,432 and 87,819, has shown the advantages to be obtained by making phonographically reproducible records of the original waves, and, by playing these records back in various combinations and in various phase relationships, whereby additional information as to reflecting or refracting formations can be obtained.

In order to take full advantage of these newer procedures the records of the waves, as picked up by the various geophones, must be very accurately correlated. The information to be derived from seismic records must be deduced solely from the time required for the propagation of the waves from their point of origin, the phase of the reflected wavefronts, which indicate whether the waves were reflected by passage into a stratum more or less dense than that through which they were being propagated prior to such reflection, and the relative instants of arrival of the wavefronts as between different geophones. All of these factors require an accurate knowledge of the elapsed time between the instant at which the original shock occurred and the instant of arrival of the waves at the respective geophones.

While any method of phonographic recording can be adapted to the procedures mentioned, there are advantages to be realized by the use of phonographic methods of recording. There are, however, some serious limitations to this method of recording as it has been practiced in the past, and these difficulties multiply as the number of tracks to be recorded is increased. Where records are made on different films there is always the possibility of different amounts of shrinkage or expansion as between the separate records, and the effects of such shrinkage or expansion may entirely vitiate conclusions drawn from phase relationships, particularly at the latter ends of the records where the time intervals are relatively long (although they are never more than five or six seconds in length).

Light valve equipment is bulky, and it is difficult to so organize it that more than a very few tracks may be formed on a single record. Modulated light sources can be arranged more compactly, but even with this smaller equipment it is difficult to get more than ten or twelve records on a single film, whereas it is highly advantageous if forty or more parallel tracks can be produced on a record carrying medium.

The attenuation of seismic waves as they are propagated through the earth is a function of their frequency, the attenuation or damping factor rising as the frequency increases. Therefore, although high-frequency components are present in the original shock wave, these components are not present in any sensible amounts in the reflections from the deeper strata. This implies that the waveforms from the earlier reflections will differ from those occurring later, which may complicate the correlation by shifting the relative position of the apparent peaks. It is therefore quite customary to introduce into the system filter circuits which will take out the high-frequency components from the recording equipment and leave only those components which are present in sensible quantities after the waves have been attenuated. It follows that a recording system for seismic waves need not have a pass band which is comparable in width to that required for sound recording; the waves which are of interest hardly ever have a frequency higher than two hundred cycles, and the most useful waves are those lying in a band between ten cycles and eighty-five cycles per second, in the case of reflection shooting, and even lower frequencies where refraction shooting is used.

The broad purpose of this invention is to provide a means for concurrently recording, in a phonographically reproducible manner, the significant frequencies in a large number of waves on a single medium, so that the relative time and phase relationships between the various waves are accurately maintained. The broad method of the invention involves producing a light spot of sufficient intensity to expose fully a photographic emulsion in an interval which is short in comparison with the period of the waves to be recorded, deflecting this spot in one dimension in a series of steps corresponding in number and position to the number of tracks to be recorded, producing a relative movement between the photographic medium and the light spot at a substantially constant rate and in a direction normal to the direction of deflection of the spot, sampling the waves from the respective pickups concurrently with the deflection of the spot into alinement with the corresponding track, and repeating this operation with respect to all pickups and all tracks a plurality of times in each cycle of the highest significant frequency to be recorded. From the apparatus point of view the preferred equipment comprises a plurality of pickup circuits, a high intensity cathode ray tube or other equivalent oscillographic apparatus having means for deflecting the cathode ray beam or other scanning element in one dimension, means for generating a stepped sawtooth deflecting wave comprising alternate intervals of steep slope and substantially zero slope, and means for switching the output of the pickup circuits concurrently with the intervals of steep slope of the deflecting wave to modulate the cathode ray beam in accordance with the outputs of the successive circuits in successive periods of zero slope.

The invention will be more clearly understood by reference to the ensuing description of a preferred form thereof, taken in connection with the accompanying drawings, wherein.

Figure 1:
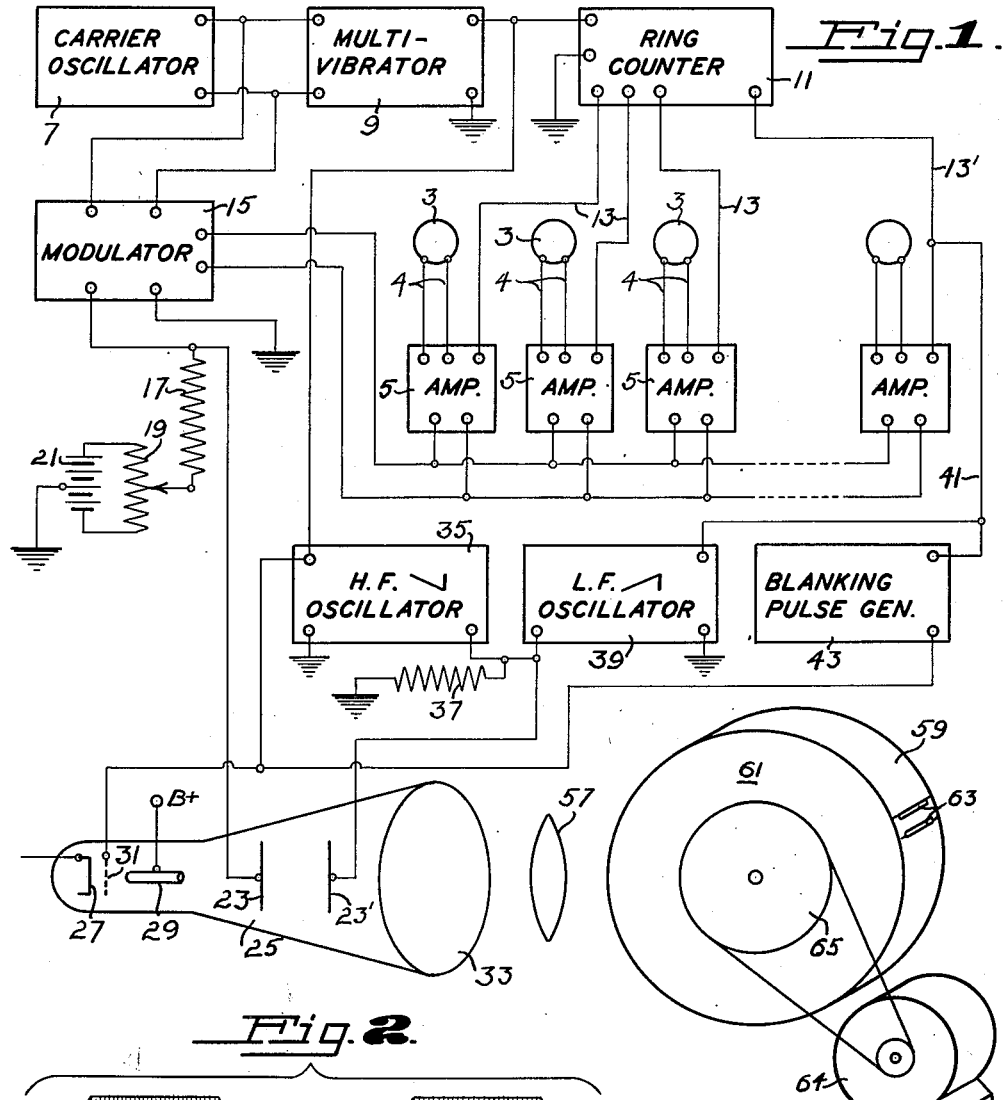
Fig. 1 is a diagram, partly in block form, of equipment embodying a preferred form of the invention.

Considering Fig. 1, a plurality of geophones 3 feed substantially identical pickup circuits 4, connecting to preamplifiers 5. These amplifiers may include any of the equipment which has been found useful in the past, such as time-gain controls, filters, and the like. These refinements are not indicated in the diagrams since they are well known and form no part of the present invention. Each amplifier, however, is provided with a gate, which will either permit or suppress its operation in accordance with pulses externally supplied thereto. Various forms of gating circuits are well known; one method of gating, which is appropriate for the purpose of this invention, being to use a pentode tube for at least one stage of the amplifier, and to apply either a positive or a negative impulse to the screen grid of such pentode, depending upon whether it is desired that the amplifier in question pass or suppress the signals fed to it. This and other forms of gates are illustrated and described in "Waveforms," vol. 19, Radiation Laboratory Series, McGraw-Hill, 1949.

The means here used for gating the amplifier comprises an oscillator 7, for generating a carrier frequency current. In the present instance it is desired that the gates of the amplifiers 5 shall remain open, for equal periods, not less than one cycle and not more than a relatively few cycles of the carrier frequency. Three cycles of the carrier may be considered a fair value. Assuming that the highest frequency to be recorded is eighty-five cycles, that, say, forty tracks are to be produced, and that each wave of the eighty-five cycle frequency is to be sampled five times per cycle, the frequency of the oscillator 7 should be $3 \times 85 \times 40 \times 5 = 51{,}000$ cycles per second.

The carrier frequency synchronizes a multivibrator 9. This device is of the type which produces positive and negative pulses of unequal length; preferably an extremely short negative pulse followed by a positive pulse, the length of which is substantially equal to three cycles of the carrier frequency. Such devices are also shown in "Waveforms," cited above. If the circuits of the multivibrator are adjusted in this manner it will fall into step with the carrier and produce one negative pulse for every three cycles of the latter.

Negative pulses from the multivibrator 9 actuate a ring counter 11 of known type, which "counts around" through as many stages as there are geophones, plus, preferably, one or two additional stages to provide a relay wherein other effects, later to be described, will take effect. In ring counters of this type, Eccles-Jordan "flip-flop" circuits are used, only one circuit being "flipped" at a time. Such counters have been used in various electronic computers, such as the Eniac and are discussed in this connection in an article on the Eniac computer in the Proceedings of the Institute of Radio Engineers, vol. 35, August 1947, pages 756 et seq. Connections 13 from the various stages connect to the gates of the amplifiers 5, actuating these amplifiers only when the corresponding stage is flipped.

The carrier current is also fed into a modulator 15. This modulator may be any one of various types, but it must not suppress the carrier, i. e. it should be a simple amplitude modulator such as are employed in developing radio broadcast signals. Each of the amplifiers 5 is connected to feed the modulator, and the latter is adjusted to produce 100% modulation at the maximum amplitude to be expected in the outputs of the amplifiers 5. The modulated output is applied across a resistor 17, the low potential end of which connects to a potentiometer 19, connected across a potential source 21, and thence to ground. The high potential end of the resistor connects to one deflecting plate 23 of a cathode ray tube 25.

The cathode ray tube is preferably of the high intensity projection type. It may, if desired, be provided with the usual two pairs of deflection plates, but only one pair is used in the equipment here described. The tube is provided with the usual electron gun comprising a cathode 27, one or more anodes 29, and a control electrode or grid 31 by means of which the intensity of the cathode ray beam may be varied. The tube is provided with the usual fluorescent screen 33. It differs from the ordinary projection type of cathode ray tube, such as is used in television, primarily in the fact that the anode 29 is preferably elliptical in cross section with the long axis of the ellipse at right angles to the direction of its deflections by the plate 23.

The pulses from the multivibrator 9, beside actuating the ring counter 11, also serve to synchronize a high-frequency saw-tooth wave oscillator 35, pulsing the latter so that it generates one saw-tooth oscillation for each pulse of the multivibrator, or, what is the same thing, for each three cycles of the carrier oscillator 7. The output of oscillator 35 connects across a resistor 37, one end of which is grounded, and the other end of which connects to the second horizontal deflecting plate 23' of the tube 25.

Also connected with its output across the resistor 37 is a low-frequency saw-tooth wave oscillator 39. This latter oscillator is synchronized through a circuit 41 connected to lead 13' for operation by the negative pulse ensuing upon the closure of the gate of the last of the amplifiers 5 to be actuated by the ring counter. The oscillator 39 therefore operates at a frequency which is an integral sub-multiple of the frequency of the high-frequency oscillator 35, or, otherwise stated, the frequency of oscillator 35 is an integral multiple of the frequency of oscillator 39. The connections of the two oscillators and their adjustments are such that the slope of the wave generated by oscillator 35 is equal and opposite to the slope of the wave generated by oscillator 39. Since both oscillators are connected across resistor 37, it follows that it is their combined output which is applied to the deflecting plate 23'. Oscillator 35 and 39 may be of any of the types employed as sweep generators in commercially available oscilloscopes, and are synchronized by the pulses fed to them in the same manner as is employed in the synchronization of such sweep circuits.

The synchronizing pulses from multivibrator 9 are applied to the grid 31 of the cathode ray tube. The synchronizing pulses from the ring counter and circuit 13' are also applied to a blanking pulse generator 43, generating a pulse which is also applied to the grid 31. The blanking pulse from the generator 43 should be long enough to blank out the cathode ray from the tube 25 during the fly-back period of oscillator 39, while the pulse from the multivibrator 9 will also be long enough to blank out the ray during the fly-back period of oscillator 35. The blanking technique is substantially that used to blank out the return line in television receivers. The blanking pulse generator 43 can, for example, be a multivibrator similar, except for its time constants, to multivibrator 9, or it may be any other form of pulse generator such as are described in "Waveforms" above cited, or such as are used for generating pulses for television synchronization.

Figure 3:
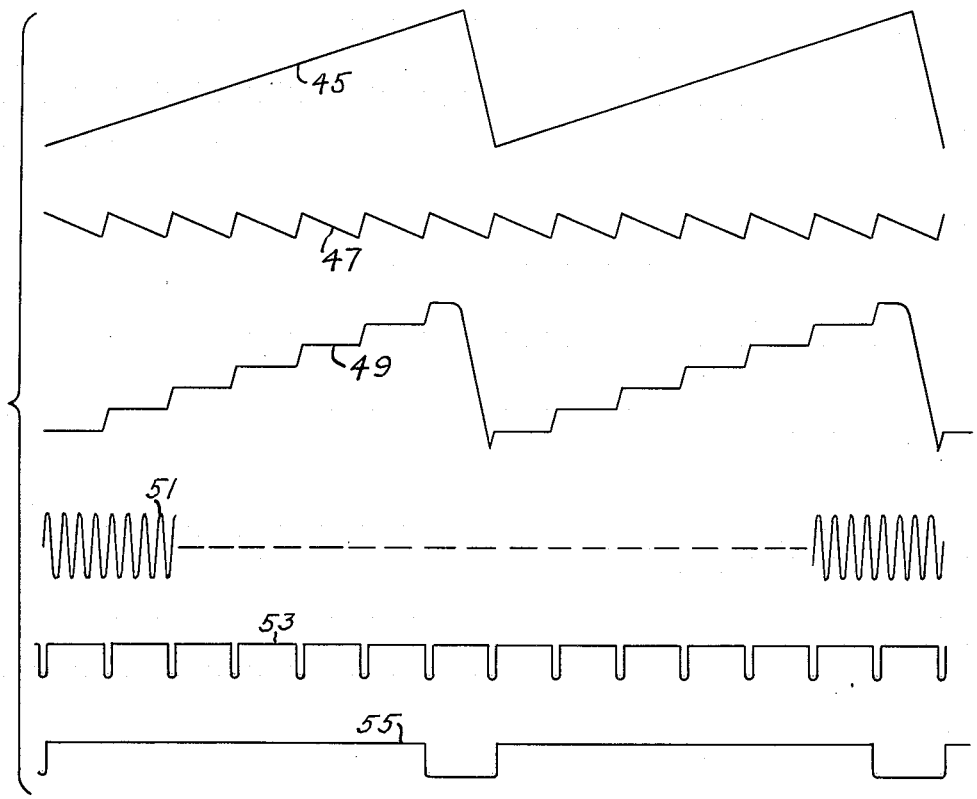
Fig. 3 is a series of graphs showing the waveforms utilized in the equipment of Fig. 1, and showing the phase relationships between these waveforms.

It will be seen that as a result of the connection here described the cathode ray will be deflected by a combination of the waves from modulator 15, carrying samples of the modulations produced from the various geophone circuits, plus waves from both high-frequency and low-frequency oscillators. The resultant effect can be visualized by considering the various waveforms shown in Fig. 3. The largest deflection is produced by a wave from oscillator 39, illustrated in the graph 45. Superimposed upon the wave 45 is the wave 47 from oscillator 35, and since the slopes of these two waves are equal and opposite the result will be a wave of the type shown in curve 49. This wave may be described as a "stepped saw-tooth wave," and the latter term will hereinafter be used to describe a wave of this character. The term is justified in that the wave follows the average value of saw-tooth wave 45, but it is characterized by alternating intervals of steep slope and of substantially zero slope. As a result of this waveform the cathode ray beam, in the absence of modulations produced from the pickup circuits, will be deflected across the face of the screen in a succession of very rapid jumps, followed by periods of "dwell," these latter periods being of the length of approximately three cycles of the carrier wave, the latter being illustrated, unmodulated, by curve 51. When the latter wave, modulated, is applied to the deflection plate, the beam will oscillate around the median position established by the wave of curve 49 at an amplitude determined by the wave picked up by the geophone circuit which is momentarily being activated.

Concurrently with the intervals of steep slope of the stepped wave, during which the cathode ray beam is being moved from one median position to the next, the beam is blanked out by the synchronizing pulses from the multivibrator 9, as is illustrated in curve 53. Similarly, the beam is blanked out during the fly-back time of the wave 45, as illustrated by curve 55.

Returning to Fig. 1, an image of the trace of the cathode ray beam on the screen 33 is focused by a suitable optical system 57 upon the surface of a photographic film which is moved at a constant rate through the plane of the image and at right angles to the dimension in which it is being deflected. In the present instance the photographic medium is a wide band of film 59 secured to the periphery of a drum 61 by suitable clips 63. Mounted in this manner a film of any width can be used, and as many tracks can be traced thereon as is deemed to be practical. Means, illustrated as a motor 64 and pulley 65, are provided for driving the drum at constant speed, preferably about one revolution in five or six seconds, and a clutch mechanism (not shown) is preferably provided to cause the drum to make a single revolution, starting at the instant of the shot. Such mechanisms are common in the art; they are frequently provided in facsimile equipment and have also been shown in prior patents of the inventor of the present equipment.

Mention has already been made of the elliptical cross section of the cathode ray beam. This results, of course, in an elliptical spot on the luminescent screen 33. The length of the major axis of the ellipse is a function of the length of the record to be produced. Assuming that a six second record is eighteen inches long, corresponding to a speed of progression of three inches per second, and that an eighty-five cycle wave is to be sampled five times per cycle, the length of the major axis of the image of the spot as focused on the film should be slightly in excess of $$\frac{3}{85 \times 5}$$

or about .007 inch. Actually it is desirable that the images of the spot overlap very slightly in successive samplings, and hence .0075 may be taken as the approximate length of the image of the spot. Eight tracks per inch can very readily be imposed upon the width of the film, permitting the forty tracks here postulated to be recorded on a strip of film five inches wide. The high intensity cathode ray tubes of the type employed in this invention are frequently made with screens ten inches in diameter, and since the ray is deflected in only one dimension, the full width of the screen may be used. Under these circumstances the image of the trace will be one-half the dimension of the trace itself, so that the actual major dimension of the beam can be about .015 inch. The minor axis of the beam may quite readily be made as small as .005 inch, so that its image upon the film will be .0025 inch. In the sampling of the various waves the luminous spot may be oscillated through amplitudes varying from zero, corresponding to a negative peak of the modulating wave, up to an amplitude of one-quarter inch peak-to-peak, on the screen, or one-half this in the image on the film.

With a high-brilliancy tube of the character heredescribed the entire face of a television field may be photographed, fully exposing the highlights. Under these circumstances each element of the field is traced by the cathode ray beam in a period of approximately one eight-millionth of a second, and it is therefore apparent that complete exposure of the record tracks will be obtained with the present equipment even where the spot is deflected to maximum amplitude, since under these conditions the time of exposure for each element is approximately ten times as long. The actual exposure of emulsion is not, of course, in this same ratio, since the area of the emulsion exposed is larger than in the television case, but it will be seen that the orders of magnitude are proper to produce a fully exposed track of the variable area type.

Figure 2:
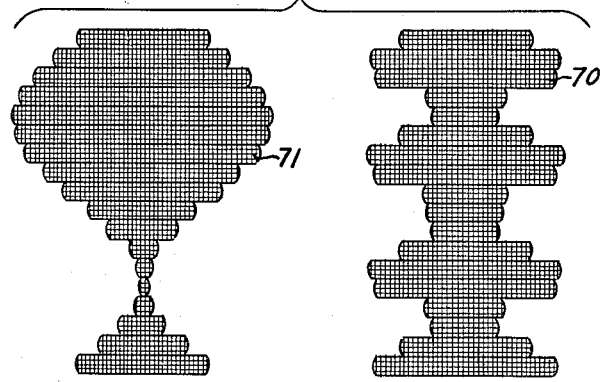
Fig. 2 is a diagram illustrating the preferred shape of the trace of the cathode ray beam and the form of the sound track produced by recording in accordance with the sampling process described.

The tracks produced are not true sine-wave tracks, but are stepped as is shown in the diagram of Fig. 2 showing two adjacent tracks, one track 70 comprising several cycles of a frequency of eighty-five cycles per second, the other track 71 showing a single cycle of a frequency of twenty-five cycles per second. The eighty-five cycle wave is indicated as having an amplitude of about one-half that of the twenty-five cycle wave. The tracks are cross-hatched to indicate black, as the entire area is fully exposed.

When such waves are scanned by a photographic pickup head, the original frequencies are reproduced, distorted by higher harmonic components, but if a low-pass filter be interposed in the reproducing system, such filter having a cut-off slightly above the maximum frequency of eighty-five cycles, the original wave is reconstituted in a manner which is satisfactory for all practical purposes of geophysical analysis.

It will be evident to those skilled in the art that various modifications of the preferred embodiment here shown are possible without departing from the spirit of the invention. For example, the switching operation which is accomplished by the ring counter 11 plus the gates in the various amplifiers 5 can be accomplished by an electronic commutator. Separate modulators can be provided for each channel, and the switching accomplished after modulation instead of prior thereto, although this involves much additional apparatus and balancing, and is therefore not recommended. Other methods are available for generating the "stepped saw-tooth" wave; e. g., an electronic counter circuit of the type wherein the charges of a small condenser are successively dumped into a larger one; if this type of circuit is used it should preferably include a circuit of the "boot-strap" type, in order to assure the charges being equal. The various modifications mentioned are all believed to require more complex apparatus than that needed for the circuits here shown, which leads to the preference for the latter. On the other hand, the ordinary vertical deflection of the cathode ray may be used instead of the mechanical motion provided by the motor 64, with some gain in simplicity, but with a sacrifice of flexibility, since the length of record thus obtainable is strictly limited by the dimensions of the tube.

The use of the elliptical or non-circular spot of the cathode ray tube, while it gives somewhat greater latitude of recording, is also a refinement rather than a necessity.

In view of the above it will be understood that the description of the specific apparatus contained herein is not intended to be limiting, but protection is desired of the invention as broadly as is stated in the following claim.

What is claimed is:

In combination, a cathode ray tube comprising means for generating a beam of cathode rays, and means for deflecting said beam in one dimension across a target, means for generating a stepped saw-tooth wave comprising alternate intervals of steep slope and intervals of substantially zero slope, a circuit connecting said generating means to said deflecting means to deflect said beam across said target in steps moving said beam to a succession of instantaneous centers, means for generating an electrical wave having a period at least as short as said intervals of substantially zero slope, and means for applying said last mentioned wave to oscillate said beam successively about each of said instantaneous centers at an amplitude within the dimension of the separation of said centers.

References Cited in the file of this patent

UNITED STATES PATENTS

| Number | Name | Date |
| --- | --- | --- |
| 2,137,262 | Bowman-Manifold | Nov. 22, 1938 |
| 2,153,655 | Urtel et al. | Apr. 11, 1939 |
| 2,250,819 | Wolf | July 29, 1941 |
| 2,275,460 | Page | Mar. 10, 1942 |
| 2,283,951 | Ripley | May 26, 1946 |
| 2,425,003 | Potter | Aug. 5, 1947 |
| 2,428,369 | Kammer | Oct. 7, 1947 |
| 2,448,762 | Beste | Sept. 7, 1948 |
| 2,450,018 | Preisman | Sept. 28, 1948 |
| 2,465,355 | Cook | Mar. 29, 1949 |
| 2,478,681 | Beers | Aug. 9, 1949 |
| 2,489,253 | Andre | Nov. 29, 1949 |
| 2,510,121 | Lehmann et al. | June 6, 1950 |
| 2,537,105 | Urick | Jan. 9, 1951 |
| 2,551,597 | Hall | May 8, 1951 |

FOREIGN PATENTS

| Number | Country | Date |
| --- | --- | --- |
| 577,120 | Great Britain | May 6, 1946 |

OTHER REFERENCES

Technical article by J. H. Parson, a publication released by the United States Atomic Energy Commission, titled: "Electronic Classifying, Cataloging and Counting Systems," dated March 25, 1948.